(12) United States Patent
Saptharishi et al.

(10) Patent No.: US 11,676,496 B2
(45) Date of Patent: Jun. 13, 2023

(54) METHODS AND SYSTEMS FOR QUERYING FOR PARAMETER RETRIEVAL

(71) Applicant: HONEYWELL INTERNATIONAL INC., Morris Plains, NJ (US)

(72) Inventors: Hariharan Saptharishi, Madurai (IN); Gobinathan Baladhandapani, Madurai (IN); Mahesh Kumar Sampath, Madurai (IN); Sivakumar Kanagarajan, Bangalore (IN)

(73) Assignee: HONEYWELL INTERNATIONAL INC., Charlotte (NC)

( * ) Notice: Subject to any disclaimer, the term of this patent is extended or adjusted under 35 U.S.C. 154(b) by 561 days.

(21) Appl. No.: 16/890,137

(22) Filed: Jun. 2, 2020

(65) Prior Publication Data
US 2021/0295710 A1 Sep. 23, 2021

(30) Foreign Application Priority Data
Mar. 19, 2020 (IN) .............................. 202011011916

(51) Int. Cl.
*G10L 15/26* (2006.01)
*G08G 5/00* (2006.01)
*G06F 16/9032* (2019.01)

(52) U.S. Cl.
CPC ....... *G08G 5/003* (2013.01); *G06F 16/90332* (2019.01); *G10L 15/26* (2013.01)

(58) Field of Classification Search
None
See application file for complete search history.

(56) References Cited

U.S. PATENT DOCUMENTS

| 6,230,131 B1 * | 5/2001 | Kuhn ..................... G10L 13/08 704/266 |
| 8,606,581 B1 | 12/2013 | Quast et al. |

(Continued)

FOREIGN PATENT DOCUMENTS

CA      2618547 A1     8/2007

OTHER PUBLICATIONS

Chen, Shuo, et al."Characterizing National Airspace System Operations Using Automated Voice Data Processing," Thirteenth USA/Europe Air Traffic Management Research and Development Seminar (ATM2019).

*Primary Examiner* — Neeraj Sharma
(74) *Attorney, Agent, or Firm* — Lorenz & Kopf LLP

(57) ABSTRACT

Systems and methods to identify a query parameter in an incoming flight voice or data communication to respond to a request. A processing system configured to: in response to receipt of a clearance message, decode the clearance message to determine whether the clearance message contains a command instruction or clearance data for a flight, and to present the command instruction to a pilot as notice to execute the command instruction or if available, obtain at least one query parameter from the clearance data to configure in a query operation to present in response to a pilot question about the command instruction. In response to receipt of the voice or data communication, determine further an intent within the voice or data communication of a question or instruction voiced by applying an acoustic model for tagging identified parts about the question or instruction voiced with query parameters in response to the pilot.

20 Claims, 5 Drawing Sheets

(56) References Cited

U.S. PATENT DOCUMENTS

| | | |
|---|---|---|
| 9,190,057 B2 | 11/2015 | Hoffmeister et al. |
| 9,230,541 B2 | 1/2016 | Li |
| 9,299,340 B2 | 3/2016 | Kar et al. |
| 9,600,231 B1 | 3/2017 | Sun et al. |
| 9,672,201 B1 | 6/2017 | Uszkoreit et al. |
| 9,852,729 B2 | 12/2017 | Hoffmeister |
| 10,515,625 B1* | 12/2019 | Metallinou ........... G10L 15/197 |
| 11,393,349 B2* | 7/2022 | Mier ....................... H04W 4/42 |
| 2002/0111803 A1 | 8/2002 | Romero |
| 2003/0006910 A1 | 1/2003 | Dame |
| 2004/0254795 A1 | 12/2004 | Fujii et al. |
| 2008/0154611 A1 | 6/2008 | Evermann et al. |
| 2015/0100311 A1* | 4/2015 | Kar ....................... G08G 5/0013 |
| | | 704/231 |
| 2015/0162001 A1 | 6/2015 | Kar et al. |
| 2016/0093302 A1* | 3/2016 | Bilek ....................... G10L 25/48 |
| | | 704/235 |
| 2017/0069136 A1* | 3/2017 | Sharma ................... G06F 3/013 |
| 2017/0161268 A1 | 6/2017 | Badaskar |
| 2019/0244528 A1 | 8/2019 | Srinivasan et al. |
| 2020/0183983 A1* | 6/2020 | Abe ................. G06F 16/90332 |
| 2020/0290740 A1* | 9/2020 | Rangan ................... A61B 5/18 |
| 2020/0365050 A1* | 11/2020 | Antraygue .......... B64C 13/0421 |
| 2021/0117069 A1* | 4/2021 | Komer ................... G01C 23/00 |
| 2021/0342634 A1* | 11/2021 | Chen ....................... G06V 10/82 |
| 2022/0043931 A1* | 2/2022 | Pierce ................... H04W 12/06 |
| 2022/0165163 A1* | 5/2022 | Miller ................. G06F 11/2002 |

\* cited by examiner

Case 1:

| | Snooping |
|---|---|
| Clearance Received (205) | "AFTER AFRIC CLB 25000" System Stores: Climb Altitude/Cleared Altitude as 25000. |
| Pilot Asks (210) | "What is the "Cleared Altitude" |
| Command and Control Decodes (215) | "What is the" |
| | Handover |
| Segmentation (220) | Remove Audio Signature Corresponding to "What is the" and Retain Audio of the Remaining (which is "Clearance Altitude") |
| Route the Rest of the Audio to Query Model/Application (225) | Clearance Altitude is Decoded by Query Model and Send 25000 as Response. |

FIG. 2A

Case 2:

| | Snooping |
|---|---|
| Clearance Received (230) | "CLEARED TO DESCENT 3000FT SET QNH 1015" System Stores: QNH 1015. |
| Pilot Asks (235) | "QNH" Please |
| Command and Control Decodes (240) | "Please" |
| | Handover |
| Segmentation (245) | Remove Audio Signature Corresponding to "Please" and Retain Audio of the Remaining (which is "QNH 1015") |
| Route the Rest of the Audio to Query Model/Application (250) | QNH is Decoded by the Query Model and Send 1015 as Response. |

FIG. 2B

METHODS AND SYSTEMS FOR QUERYING FOR PARAMETER RETRIEVAL

CROSS REFERENCE TO RELATED APPLICATION

This application claims priority to Indian Provisional Patent Application No. 202011011916, filed Mar. 19, 2020, the entire content of which is incorporated by reference herein.

TECHNICAL FIELD

The subject matter described herein relates generally to vehicle systems, and more particularly, embodiments of the subject matter relate to avionics systems and methods using speech recognition for transcribing Air Traffic Controller (ATC) voice communications with the cockpit to enable cockpit personnel to query the transcribed communications for at least required ATC clearance communications.

BACKGROUND

The Air Traffic Controller (ATC) is typically involved with voice communications between a pilot or crewmember onboard the various aircraft within controlled airspace. The ATC and the pilot are often in constant communication over a Voice Channel or the Controller Pilot Data Link Communication (CPDLC) through the course of the flight. The ground to air communications includes clearance, information or requests for message elements. The ATC to pilot communications have several limitations including but not restricted to miscommunication, transmission errors, misinterpreted voice instructions, ambiguous communications, non-standard phraseology that can cause an increased pilot overload of operational tasks when listening to ATC while flying the aircraft. Also, pilots are not immune to certain human fallibilities that may occur when having conversations with the ATC (e.g., inexperience, hearing difficulties, memory lapse, language barriers, distractions, fatigue, etc.). Pilots often work around these limitations by relying on a scratchpad display and multifunction controls of the Multipurpose Control Display Unit (MCDU) for flight instructions or on a digital notepad. The CPDLC communication can alleviate or overcome several of these limitations by enabling transmission of non-urgent messages to an aircraft for display on a flight deck as an alternative to voice communications. However, drawbacks still exist with both the voice and CPDLC based communications. For example, it is often the case that the pilot has to monitor the ATC instructions and then has to recall, when necessary, the ATC instruction to execute the instruction at an appropriate time. These steps of having to recall and then execute the flight instruction can be particularly strenuous in instances then the pilot is overtaxed with an excessive set of workload tasks (e.g. on an approach) and this can potentially lead to pilot error.

Accordingly, it is desirable to provide aircraft systems and methods for mitigating recollection requirements for the pilot in flight operations by implementing speech recognition systems in the cockpit that are capable of command, control and transcriptions of ATC communications that enable the use of the pilot of a query-based method and system to query the transcribed ATC communications to find the required information without having to manual transcribe or recall the information from the prior conversations with the ATC. Other desirable features and characteristics of the methods and systems will become apparent from the subsequent detailed description and the appended claims, taken in conjunction with the accompanying drawings and the preceding background.

BRIEF SUMMARY

Aircraft systems and related operating methods are provided. In one embodiment, a system to identify a query parameter contained in an incoming flight voice or data communication to respond to a request is provided. The system includes a processing system configured to: in response to receipt of a clearance message either by voice or data communication, decode the clearance message to determine whether the clearance message contains a command instruction or clearance data for a flight; in response to a determination that the clearance message contains the command instruction or clearance data, either present the command instruction to a pilot as notice to execute the command instruction or if available, obtain at least one query parameter from the clearance data to configure in a query operation to present in response to a pilot question about the command instruction; in response to receipt of the voice or data communication, determine further an intent within the voice or data communication of a question or instruction voiced by applying an acoustic model by a command and control module; and identify, by the command and control module, a set of parts contained in voice communication using a speech recognition system or in data communication for tagging identified parts about the question or instruction voiced with query parameters in response to the pilot.

In various exemplary embodiments, the system further includes: to respond to the pilot question, segment, by a segmentation module, at least one part of the question or instruction voiced with a particular query parameter associated with a question tag. The system further includes: send a remainder, by the segmentation module, of at least one part of the question or instruction voiced not associated with the question tag to a query engine wherein the query engine applies a query acoustic model to decode a query parameter associated with the question or instruction voiced. The system further includes: the query engine applies the query acoustic model to: extract a query parameter of interest contained in a remainder voice communication wherein a query parameter of interest constitutes an answer to the question tag. The system further includes: in response to a receipt of the answer, display or voice via a text to speech module, the answer to the pilot to assist in responding to the pilot question. The answer is based in part on the query parameter of interest. The system further includes: apply, by a second speech recognition module, a second speech application to extract the query parameter of interest contained in a remainder voice communication wherein the query parameter of interest is based on a set of data sources from multiple flight systems. The system further includes: implement a parameter identification and storage repository for storing query parameters related to the clearance instruction or the clearance data to assist to respond to the pilot question.

In another exemplary embodiment, a method of detecting a question by a pilot or a clearance instruction in a sequence of communications is provided. The method includes: in response to receipt of a clearance message either by a flight voice or data communication, decoding the clearance message for determining whether the clearance message contains a command instruction for a querying operation or clearance data to store locally by an ownship; in response to determining that the clearance message contains the command instruction or clearance data, presenting the command instruction to a pilot for execution of the command instruction, or if available, obtaining at least one query parameter from the clearance data for configuring in a query operation to respond to the question by the pilot to enable the pilot to confirm execution of the command instruction; in response to receipt of the flight voice or data communication, determining an intent within the flight voice or the data communication by executing an acoustic model of a command and control module; and identifying, by the command and control module, a set of parts contained in the flight voice by a speech recognition system or in data communication of text for tagging identified parts wherein the tagging of the identified parts enables identifying one or more questions by query parameters in the flight voice or data communication.

The method further includes: in response to a question identified by a segmentation module of at least one part of the flight voice or data communication, categorizing the question by tagging an associated query parameter with the flight voice or data communication; and segmenting, by a segmentation module, a flight voice communication for removing a segment contained in the flight voice or data communication which is associated with a question tag.

The method further includes: if the voice communication includes the question tag, sending a remainder, by the segmentation module, of the flight voice or data communication not associated with the question tag to a query engine for applying a query acoustic model for decoding one or more query parameters associated with the flight voice or data communication. The method further includes: the query engine applying the query acoustic model by extracting a query parameter of interest contained in a remainder flight voice communication wherein a query parameter of interest constitutes a basis of an answer response to the question tag. The method further includes: in response to a receipt of the answer response, displaying the answer response to the pilot for assisting in response to a question by tagging the flight voice or data communication. The answer response is based in part on the query parameter of interest. The method further includes: applying, by a secondary speech recognition module, a secondary speech application for extracting a query parameter of interest contained in a remainder flight voice communication wherein the query parameter of interest is based on a set of data sources from at least flight management systems. The method further includes: implementing a parameter identifier and storage repository for storing query parameters related to the clearance instruction or the clearance data for assisting in configuring the query operation.

In yet another exemplary embodiment, an aircraft system is provided. The aircraft system includes a communications system to receive and decode a plurality of requests and instructions related to clearance communications; a data storage element maintaining a data set of parameter identifiers corresponding to respective clearance communications of each clearance communication; in response to receipt of a clearance message either by a flight voice or data communication, decode the clearance message to determine whether the clearance message contains a command instruction which has been voiced or clearance data; in response to the determination that the clearance message contains the command instruction or clearance data, present the command instruction to a pilot to confirm an execute of the command instruction or if available, obtain at least one query parameter from the clearance data to configure a query operation to respond to a pilot question about the command insurance; in response to receipt of the flight voice or data communication, determine an intent within the flight voice or data communication by applying an acoustic model of a command and control module; identify, by the command and control module, one or more parts contained in a flight voice communication using a speech recognition system or in data communication; tag each identified part of the flight voice or data communication; and identify a question or instruction by a query parameter associated with a part of the flight voice or data communication.

In various exemplary embodiments, the aircraft system further includes: in response to a question identified, apply a segmentation module to at least one part of the flight voice or data communication to categorize the question by a corresponding tag associated; and segment, by the segmentation module, the voice communication to remove a voice segment contained in the flight voice communication which is associated with a question tag. The aircraft system further includes: if the voice communication includes the question tag, send a remainder, by the segmentation module, of the flight voice communication not associated with the question tag to a query engine wherein the query engine applies a query acoustic model to decode one or more query parameters. The aircraft system further includes: the query engine applies the query acoustic model to: extract a query parameter of interest contained in a remainder flight voice communication wherein the query parameter of interest corresponds to an answer response to the question tag.

Furthermore, other desirable features and characteristics of the subject matter described herein will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following figures, wherein like numerals denote like elements, and wherein:

FIGS. 2A and 2B depict exemplary charts of the snooping and handover modes of a query processing system in accordance with one or more exemplary embodiments;

DETAILED DESCRIPTION

Figure 1:
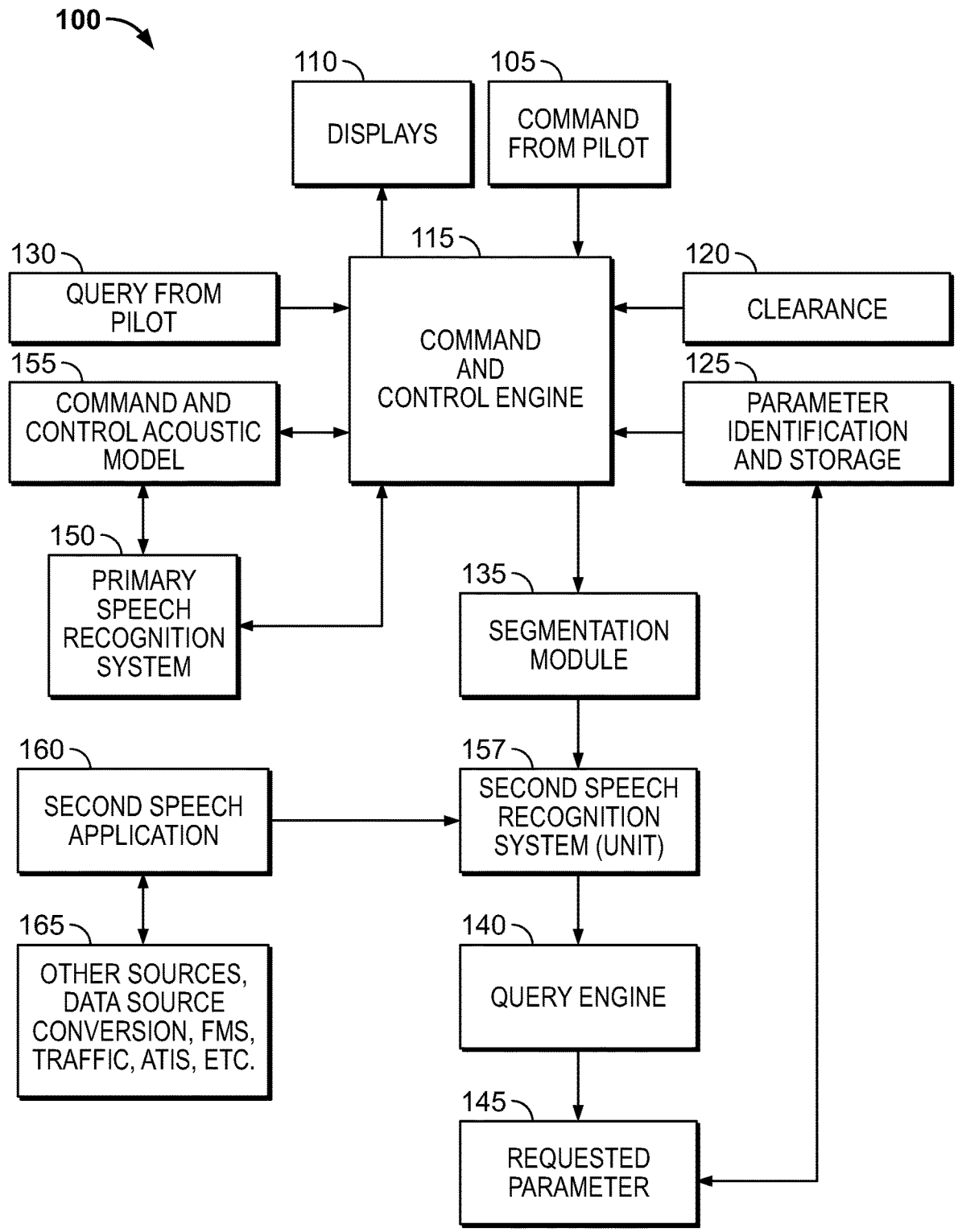
FIG. 1 depicts an exemplary diagram of a query processing system in accordance with one or more exemplary embodiments.

The following detailed description is merely exemplary in nature and is not intended to limit the subject matter of the application and uses thereof. Furthermore, there is no intention to be bound by any theory presented in the preceding background, brief summary, or the following detailed description.

An unresolved limitation of both voice or CPDLC based communication systems are the requirements on the part of the pilot having to perform dual tasks of monitoring ATC instructions and then having to remember when to execute the ATC instructions received at a later appropriate time.

This set of dual tasks ascribed to the pilot can lead to an overload of tasks lessening pilot operational performance.

Moreover, increases in the likelihood of pilot errors during ATC to pilot voice communications can be attributed to various drawbacks of the current communication systems. For example, the drawbacks include the occasionally excessively long instructions received from ATC that may not be understood correctly, instances where the pilot is expected (or is designated) to be the final authority to make decisions based on what information is received. Also, at various times, the ATC may itself become too busy, the result of which is that the ATC may end up receiving repetitious sets of instructions that may take time to resolve before the ATC's operation can revert to a more level workload. Other cases can involve: the tracking and recall of a series of next instructions issued on a downward path waypoint, at an upcoming airway or Navaid, and conditional clearance instructions that have given by ATC Also, not all aircraft and airspace/ATC are equipped with CPDLC and voice communication is the baseline type of communications that are used extensively between the pilot and the ATC. As another example, the ATC provides some conditional clearances over voice, it may be difficult for the pilot to remember them and comply with the conditional clearances at the required time. Also, similar problems though with a reduced probability do still exist with CPDLC communications. Typically, such problems are attempted to be overcome by the pilot requesting the ATC to repeat ambiguous instructions or by use of recording and playback systems in the cockpit. Such systems do not completely solve the problems mentioned above because they are not automated and are not context-sensitive. They may also still result in or call for increased pilot and ATC workload and adds to the delays in the decision making of the participating parties.

Various audio devices provide recording capabilities. For example, the GARMIN® G1000 Audio panel is an example of a device that provides a digital recorder with playback capability. Another model is the GARMIN® GMA 1347 which is a digital recorder with playback capability of up to 2.5 minutes of communication receiver (COM) signal recording. The signals from all of the selected COM radios are recorded and can be played back in the cockpit.

Even with such a recording and playback system, it can be difficult for the pilot because the instructions are not easily located and can be buried in limited frames of the recorded, and even in the last frame of the recorded audio. Hence, there are inherent disadvantages and misses of recorded instructions when certain human factors considerations occur. Therefore, it is desirable for a system wherein the pilot can get the required data accurately and with the reduced time taken to discover and extract the required information in a conversation with the ATC.

In various exemplary embodiments, the present disclosure describes aspects of a voice-activated flight deck method and system that enables speech recognition or brings a speech recognition system into the cockpit. The method and system are capable of command and control and transcribing the ATC conversation.

In various exemplary embodiments, the present disclosure describes a method and a system of query-based processing of pilot requests in which the pilot can query the required information from the recorded conversation with the ATC.

Embodiments of the subject matter described herein relate to systems and methods for a speech recognition system which supports a command and control based acoustic model along with minimal acoustic signatures to determine whether incoming audio is a query and to discover an ATC instruction in response to the query.

For purposes of explanation, the subject matter is primarily described herein in the context of aircraft operating in a controlled airspace; however, the subject matter described herein is not necessarily limited to aircraft or avionic environments, and in alternative embodiments, may be implemented equivalently for ground operations, marine operations, or otherwise in the context of other types of vehicles and travel spaces.

In one or more embodiments, for each clearance communication, a corresponding clearance communication parameter identifier is created for the particular clearance communication. For example, in one embodiment, a clearance communication entry in a parameter identification and storage database that contains one or more identifiers associated with the clearance communication (e.g., a flight identifier, call sign, or other aircraft identifier associated with the clearance communication), a radio frequency or communications channel associated with the clearance communication, an action associated with the clearance communication (e.g., landing, takeoff, pushback, hold, or the like), an operational subject of the clearance communication (e.g., a runway, a taxiway, a waypoint, a heading, an altitude, a flight level, or the like), and the values for one or more operational parameters contained in the clearance communication (e.g., the runway identifier, taxiway identifier, waypoint identifier, heading angle, altitude value, or the like). Each clearance communication entry may also include or otherwise maintain an association with the source of the clearance communication (e.g., ownship, air traffic control, or another aircraft).

Each clearance communication instruction may also be tagged to indicate whether its associated clearance communication is an aircraft request, an air traffic control (ATC) approval of a request, an ATC instruction, an aircraft response, or an unknown type of communication.

FIG. 1 is an exemplary diagram of the query processing system 100 in accordance with an embodiment. In FIG. 1, a command is received from the pilot at block 105. The command is sent to the command and control engine 115 which in turn displays the command on a cockpit display system 110. The clearance instruction sent from clearance block 120 to the command and control engine 115 for processing. Also, the query from the pilot is sent from the query from the pilot block 130 to the command and control engine 115. The command and control engine 115 determines by the use of a command and control application the intent of the incoming audio; whether it is a query from the pilot (i.e., from pilot block 130) or a clearance instruction from the ATC (i.e. from clearance block 120). The command and control engine 115 uses identifying parts of speech (POS) tags that help in identifying questions and query parameters from inputs of parameter identification stored in the parameter identification and storage repository of block 125. The command and control engine 115 is supported by a speech recognition system 150 which supports the command and control acoustic model 155 along with minimal acoustic signatures to determine whether incoming audio is a query. The segmentation module 135 will segment question signatures, trim the audio, and handover the remaining audio to the second speech recognition unit 157. The secondary speech recognition unit 157 will process the remaining trimmed audio signal and decode the query. The decoding process of the second speech recognition unit 157 is based in part on inputs from a secondary speech application 160 that extracts the required parameter from a data source (i.e. a conversion, ATIS, traffic, FMS or other data sources based on the current context).

In various exemplary embodiments, the query processing system 100 enables the pilot can query the required information from the conversation. The command and control acoustic model 155 is configured with stringent limitations in terms of timing and accuracy, adding more acoustic signatures for all the query parameters (like, QNH, Last cleared altitude, Which approach) to update processes of command and control engine 115 thereby increasing the model size without causing increases in timing and reductions inaccuracy.

The requirement (i.e. from human factor empirical testing) for command and control acoustic model 155 is to have accuracy above 97% and response time less than 500 ms per utterance. The command and control engine 115 is configured with a command and control acoustic model 155 that supports nearly one hundred plus commands with an in-flight intent accuracy when applied to audio received in the range of 98% to 99% and a response time of in the range of 600 to 800 ms.

the "querying" of the audio signals is routed to the command and control acoustic model 155 which support a wide range (i.e. not restricted) of acoustic signatures to determine the query (from the pilot) that is incoming and the rest or remaining of the audio incoming which is not subject to a query. The remaining audio will be segmented by the segmentation module 135 and sent to the querying model (i.e. the command and control acoustic model derived from the data via the secondary speech application 160) to fetch the query parameter. The query processing system 100 will be able to, therefore, support all the conversations that go via COM (i.e. ATIS, traffic, standby channels) from the data source or any other data source based on the current context.

FIGS. 2A and 2B depict exemplary charts of the snooping and handover modes of the query processing system in accordance with various embodiments. In FIG. 2A, in case 1, in the snooping mode, at 205, a clearance is received from the ATC. In this case, 1, the clearance instruction that is snooped is "AFTER AFRIC CLB 2500". The query processing system decodes the clearance instruction using the command and control acoustic model based on parameter identification stored and stores the audio of "climb altitude/cleared altitude as 25000". The pilot at 210, performs a query and asks, "What is the "cleared altitude". The command and control engine decodes the query by applying the primary speech recognition system with the command and control acoustic model to decode the audio of "What is the". Next, the query processing system switches to the handover mode, and performs a segmentation of the audio at 220 by the segmentation module to remove the audio signature corresponding to "What is the" and retain the audio of the remaining part of the speech of the "clearance altitude". Then at 225, in the handover mode, routes the rest of the audio to a query model and application (i.e. the command and control acoustic model and applications of the primary speech recognition system) to enable the clearance altitude to be decode by the query model and send the response of the clearance instruction of "25000" to the pilot.

In FIG. 2B, in case 2, the query processing system is in a snooping mode, the clearance instruction that is snooped is "CLEARED TO DESCENT 3000 FT SET QNH 1015" at 230. The pilot, at 235, asks via a voiced request, "QNH" please. The command and control system by applying command and control acoustic model and applications of the primary speech recognition system recognizes the "please" voiced at 240 for further processing of a responsive response. Next, in the handover mode, where the query processing system formulates a response where the segmentation module performs a segmentation of the audio at 245 by the removal of the audio signature corresponding to "please" and retaining the audio of the remaining audio received which is "QNH 1015". At 250, the rest of the audio received is routed to the query model and application (i.e. the command and control acoustic model and the command and control engine).

Figure 3:
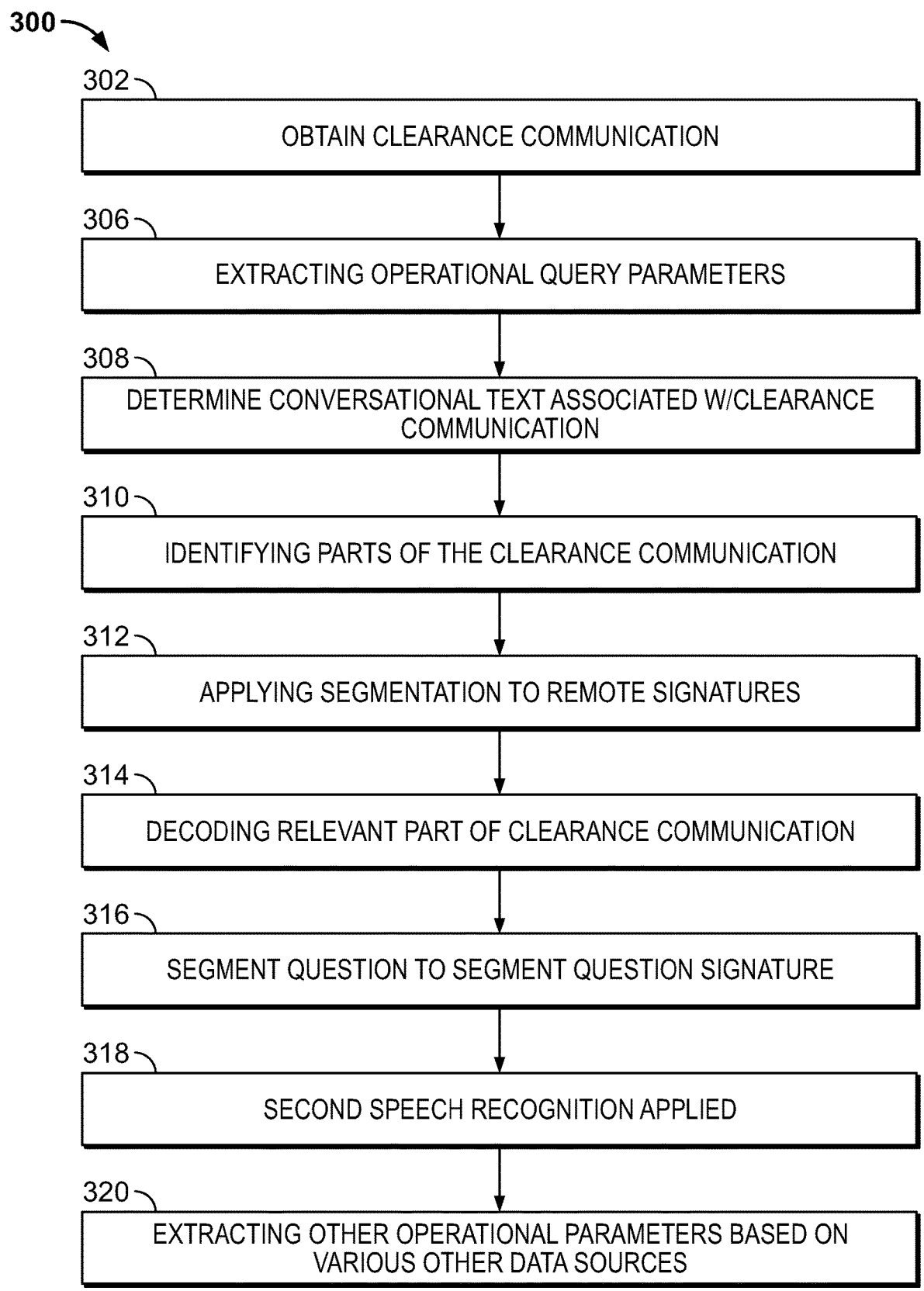
FIG. 3 depicts an exemplary flowchart of a query processing system in accordance with one or more exemplary embodiments.

FIG. 3 is an exemplary flowchart of the query processing system in accordance with an embodiment. The various tasks performed in connection with the illustrated query process 300 may be implemented using hardware, firmware, software executed by processing circuitry, or any combination thereof. For illustrative purposes, the following description may refer to elements mentioned above in connection with FIG. 1. In practice, portions of the query process 300 may be performed by different elements of the aircraft system or the query processing system. That said, exemplary embodiments are described herein in the context of the query process 300 is primarily performed by the command and control engine 115 of FIG. 1 (e.g. implementing a command and control acoustic model 155), which may be implemented as part of the query processing system 100 and/or a flight management system (FMS) onboard an aircraft. It should be appreciated that the query process 300 may include any number of additional or alternative tasks, the tasks need not be performed in the illustrated order and/or the tasks may be performed concurrently, and/or the query process 300 may be incorporated into a more comprehensive procedure or process having additional functionality not described in detail herein. Moreover, one or more of the tasks shown and described in the context of FIG. 3 could be omitted from a practical embodiment of the query process 300 as long as the intended overall functionality remains intact.

In exemplary embodiments, the query process 300 is initiated when an aircraft enters or otherwise begins operating in controlled airspace or transfers from one airspace to another airspace. In this regard, in one or more embodiments, before initializing the query process 300, the command and control engine 115 (of FIG. 1) may remove or delete clearance communication entries pertaining to preceding operations of the aircraft to effectuate clearing or otherwise resetting the parameter data of the parameter identification and storage at block 125 (of FIG. 1) for the current operation in the controlled airspace.

The illustrated the query process 300 begins by receiving or otherwise obtaining a clearance communication (task 302). Some clearance communications may be received as speech in an audio format by a radio communications system onboard the aircraft. As described above, in such embodiments, the query processing system performs speech recognition to convert the audio input into a corresponding textual representation for segmentation by the segmentation module 135.

The query process 300 continues by extracting operational parameters from clearance communication (task 306). In this regard, the processing system and/or control module 102 attempts to discretize or quantify the clearance communication across several different fields that may be utilized to characterize or otherwise define the operational context of the clearance communication. For example, as described above, in exemplary embodiments, the query processing system parses or otherwise analyzes the textual representation of the clearance communication to extract one or more of identifier of a question contained within the clearance communication, an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and an action associated with the clearance communication (e.g., landing, takeoff, pushback, hold, or the like). The extracted fields of the clearance communication may then be utilized to characterize or otherwise define the operational context of clearance communication.

In exemplary embodiments, the query process 300 also identifies or otherwise determines the conversational context associated with clearance communication (task 308). In this regard, the query processing system may analyze using a command and acoustic model in clearance communications in the parameter identification and storage and determine as to whether the clearance communication is a request or instruction, response or acknowledgment, etc. For example, using the flight identifier associated with the clearance communication, the command, and control engine may query or otherwise search the parameter and identification storage for clearance communication entries associated with aircraft.

At task 310, parts of the clearance communication are identified to enable identifying questions and query parameters. Next at task 312, segmentation is applied to remove signatures corresponding to parts of the clearance communication. At task 314, the relevant part of the clearance communication is decoded and sent as a response to the request. At task 416, the segmentation is applied to segment the question signature, trim it and handover the remaining audio for processing my a secondary speech unit. At task 318, a secondary speech recognition unit processes the remained trimmed audio segment and applies a secondary speech application to decode the query. At task 320, the secondary speech application extracts a required parameter from various other data sources.

Figure 4:
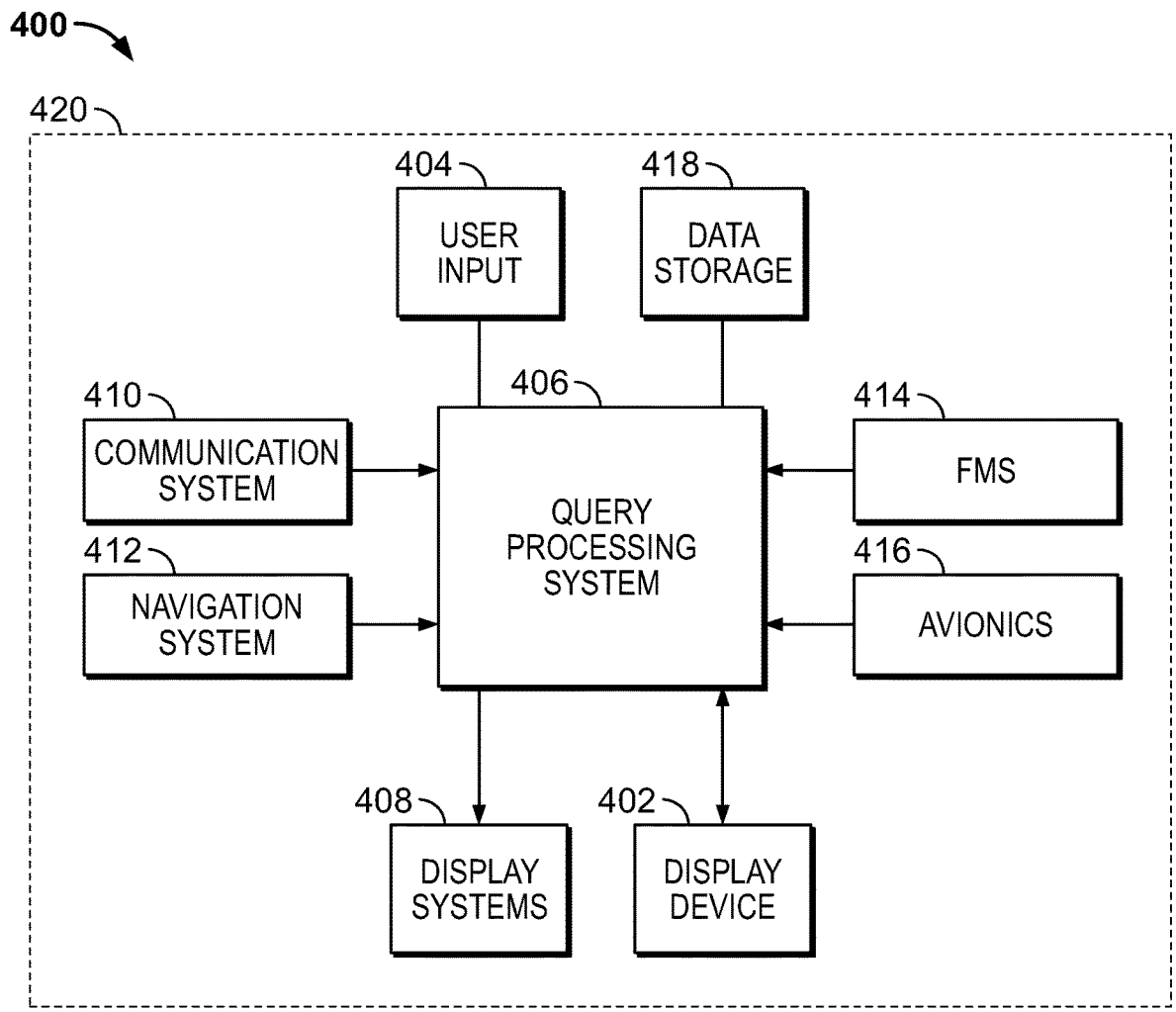
FIG. 4 depicts an exemplary diagram of a query processing system in accordance with one or more exemplary embodiments.

FIG. 4 illustrates an exemplary embodiment of the query processing system with aircraft systems in accordance with various embodiments. The system 400 includes, without limitation, a display device 402, one or more user input devices 404, a query processing system 406, a display system 408, a communications system 410, a navigation system 412, a flight management system (FMS) 414, one or more avionics systems 416, and a data storage element 418 suitably configured to support operation of the system 400, as described in greater detail below.

In exemplary embodiments, the display device 402 is realized as an electronic display capable of graphically displaying flight information or other data associated with the operation of the aircraft 420 under control of the display system 408 and/or processing system 506. In this regard, the display device 402 is coupled to the display system 408 and the processing system 406, wherein the processing system 406 and the display system 408 are cooperatively configured to display, render, or otherwise convey one or more graphical representations or images associated with operation of the aircraft 420 on the display device 402. The user input device 404 is coupled to the processing system 406, and the user input device 404 and the processing system 406 are cooperatively configured to allow a user (e.g., a pilot, co-pilot, or crew member) to interact with the display device 402 and/or other elements of the system 400, as described in greater detail below. Depending on the embodiment, the user input device(s) 404 may be realized as a keypad, touchpad, keyboard, mouse, touch panel (or touchscreen), joystick, knob, line select key or another suitable device adapted to receive input from a user. In some embodiments, the user input device 404 includes or is realized as an audio input device, such as a microphone, audio transducer, audio sensor, or the like, that is adapted to allow a user to provide audio input (i.e. query request from the pilot) to the system 400 in a "hands-free" manner without requiring the user to move his or her hands, eyes and/or head to interact with the system 400.

The processing system 406 generally represents the hardware, software, and/or firmware components configured to facilitate communications and/or interaction between the elements of the system 400 and perform additional tasks and/or functions to support the operation of the system 400, as described in greater detail below. Depending on the embodiment, the processing system 406 may be implemented or realized with a general-purpose processor, a content addressable memory, a digital signal processor, an application-specific integrated circuit, a field-programmable gate array, any suitable programmable logic device, discrete gate or transistor logic, processing core, discrete hardware components, or any combination thereof, designed to perform the functions described herein. The processing system 406 may also be implemented as a combination of computing devices, e.g., a plurality of processing cores, a combination of a digital signal processor and a microprocessor, a plurality of microprocessors, one or more microprocessors in conjunction with a digital signal processor core, or any other such configuration. In practice, the processing system 406 includes processing logic that may be configured to carry out the functions, techniques, and processing tasks associated with the operation of the system 400, as described in greater detail below. Furthermore, the steps of a method or algorithm described in connection with the embodiments disclosed herein may be embodied directly in hardware, in firmware, in a software module executed by the processing system 406, or in any practical combination thereof. For example, in one or more embodiments, the processing system 406 includes or otherwise accesses a data storage element (or memory), which may be realized as any sort of non-transitory short- or long-term storage media capable of storing programming instructions for execution by the processing system 406. The code or other computer-executable programming instructions, when read and executed by the processing system 406, cause the processing system 406 to support or otherwise perform certain tasks, operations, functions, and/or processes described herein.

The display system 408 generally represents the hardware, software, and/or firmware components configured to control the display and/or rendering of one or more navigational maps and/or other displays about the operation of the aircraft 420 and/or onboard systems 410, 412, 414, 416 on the display device 402. In this regard, the display system 408 may access or include one or more databases suitably configured to support operations of the display system 408, such as, for example, a terrain database, an obstacle database, a navigational database, a geopolitical database, a terminal airspace database, a special use airspace database, or other information for rendering and/or displaying navigational maps and/or other content on the display device 402.

In exemplary embodiments, the aircraft system 400 includes a data storage element 418, which contains aircraft procedure information (or instrument procedure information) for a plurality of airports and maintains an association between the aircraft procedure information and the corresponding airports. Depending on the embodiment, the data storage element 418 may be physically realized using RAM, ROM memory, flash memory, registers, a hard disk, or another suitable data storage medium known in the art or any suitable combination thereof.

As used herein, aircraft procedure information should be understood as a set of operating parameters, constraints, or instructions associated with a particular aircraft action (e.g., approach, departure, arrival, climbing, and the like) that may be undertaken by the aircraft 420 at or in the vicinity of a particular airport.

Each airport may have one or more predefined aircraft procedures associated therewith, wherein the aircraft procedure information for each aircraft procedure at each respective airport may be maintained by the data storage element 418. Still referring to FIG. 4, in an exemplary embodiment, the processing system 406 is coupled to the navigation system 412, which is configured to provide real-time navigational data and/or information regarding the operation of the aircraft 420. The navigation system 412 is also capable of obtaining or otherwise determining the heading of the aircraft 420 (i.e., the direction the aircraft is traveling in relative to some reference). In the illustrated embodiment, the processing system 406 is also coupled to the communications system 410, which is configured to support communications to and/or from the aircraft 420. For example, the communications system 410 may support communications between the aircraft 420 and air traffic control or another suitable command center or ground location. In this regard, the communications system 410 may be realized using a radio communication system and/or another suitable data link system.

In an exemplary embodiment, the processing system 406 is also coupled to the FMS 414, which is coupled to the navigation system 412, the communications system 410, and one or more additional avionics systems 416 to support navigation, flight planning, and other aircraft control functions conventionally, as well as to provide real-time data and/or information regarding the operational status of the aircraft 420 to the processing system 406. Although FIG. 4 depicts a single avionics system 416, in practice, the system 400 and/or aircraft 420 will likely include numerous avionics systems for obtaining and/or providing real-time flight-related information that may be displayed on the display device 402 or otherwise provided to a user (e.g., a pilot, a co-pilot, or crew member).

It should be understood that FIG. 4 is a simplified representation of the system 400 for purposes of explanation and ease of description and FIG. 4 is not intended to limit the application or scope of the subject matter described herein in any way. It should be appreciated that although FIG. 4 shows the display device 402, the user input device 404, and the processing system 406 as being located onboard the aircraft 420 (e.g., in the cockpit), in practice, one or more of the display device 402, the user input device 404, and/or the processing system 406 may be located outside the aircraft 420 (e.g., on the ground as part of an air traffic control center or another command center) and communicatively coupled to the remaining elements of the system 400 (e.g., via a data link and/or communications system 410). Similarly, in some embodiments, the data storage element 418 may be located outside the aircraft 420 and communicatively coupled to the processing system 406 via a data link and/or communications system 410.

Figure 5:
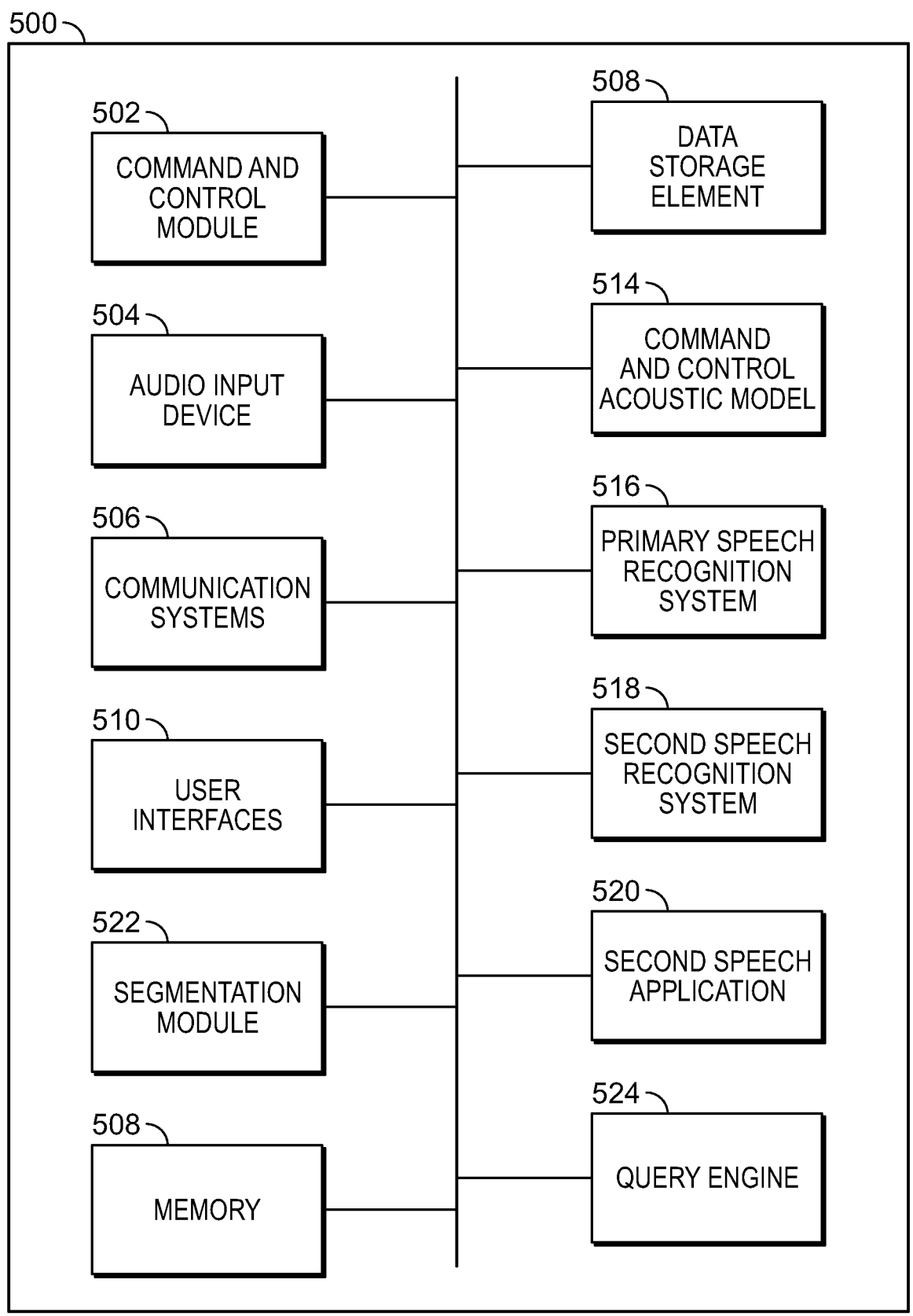
FIG. 5 depicts an exemplary diagram of a query processing system in accordance with one or more exemplary embodiments.

FIG. 5 depicts an exemplary embodiment of a query processing system 500 for identifying and locating in recorded clearance communications, instructions in response to the pilot request. The illustrated query processing system 500 includes a command and control module 502, an audio input device 504 (or microphone), one or more communications systems 506, a data storage element 508 (or memory), and one or more output user interfaces 510.

The command and control module 502 generally represents the processing system of the query processing system 500 and may include any sort of hardware, firmware, circuitry and/or logic components or combination thereof that is coupled to the microphone 604 and communications system(s) 506 to receive or otherwise obtain clearance communications and decode the clearance communications to detect parameter identification identifiers, to perform segmentation of audio received from the ATC, to determine whether audio received is a request or clearance instruction, etc. . . . . Depending on the embodiment, the command, and control module 502 may be implemented or realized with a general-purpose processor, a microprocessor, a controller, a microcontroller, a state machine, a content addressable memory, an application-specific integrated circuit, a field-programmable gate array, any suitable programmable logic device, etc. In exemplary embodiments, the control module 502 may also include or otherwise access a data storage element or memory (e.g., memory 508), including any sort of RAM, read-only memory (ROM), flash memory, or any other short or long term storage media or other non-transitory computer-readable medium, which is capable of storing programming instructions for execution by the command and control module 502. The computer-executable programming instructions, when read and executed by the control module 502, cause the command and control module 502 to perform or otherwise support the tasks, operations, functions, and processes described herein.

The audio input device 504 generally represents any sort of microphone, audio transducer, an audio sensor, or the like capable of receiving voice or speech input at the location of the command and control module 502. In this regard, in one or more embodiments, the audio input device 504 is realized as a microphone 504 onboard the aircraft to receive voice or speech annunciated by a pilot or other crewmember onboard the aircraft inside the cockpit of the aircraft. The communications system(s) 506 (e.g., communications system 410 of FIG. 4) generally represent the avionics systems capable of receiving clearance communications from other sources, such as, for example, other aircraft, an air traffic controller, or the like. Depending on the embodiment, the communications system(s) 506 could include one or more of a very high frequency (VHF) radio communications system, a controller-pilot data link communications (CPDLC) system, an aeronautical operational control (AOC) communications system, an aircraft communications addressing and reporting system (ACARS), and/or the like.

In the illustrated embodiment, the computer-executable programming instructions executed by the command and control module 502 cause the command and control module 502 to generate, execute, or otherwise implement a command and control acoustic model 514 capable of analyzing, parsing, or otherwise processing voice, speech, or other audio input received by the command and control module 502 to convert the received audio into a corresponding textual representation. In this regard, the command and control acoustic model 514 may implement or otherwise support a speech recognition engine (or voice recognition engine) or another speech-to-text system. In one or more embodiments, the command and control acoustic model 514 may also mark, tag, or otherwise associate a transcribed textual representation of a clearance communication with an identifier or other indicia of the source of the clearance communication request or instruction (e.g., the onboard microphone 504, a radio communications system 506, or the like).

In the illustrated embodiment, the computer-executable programming instructions executed by the command and control module 502 also cause the command and control module 502 to generate, execute, or otherwise implement a command and control acoustic model 514, a primary speech recognition system 516, a secondary speech recognition system 518, a secondary speech application 520, a segmentation module 522 that receives the transcribed textual clearance communications from the primary speech recognition system 516 or receives clearance communications in textual form directly from a communications system 506 (e.g., a CPDLC system). The primary speech recognition system 516 parses or otherwise analyzes the textual representation of the received clearance communications together with the command and control acoustic model, the parameter identifiers from the memory 508, the segmentation module 522 and generates corresponding clearance communication entries to the query engine 524. Additionally, the query engine 524 receives input from a secondary speech recognition system 518 applying a secondary speech application 520.

As described above, in exemplary embodiments, for each request or instruction related to a clearance communication received by the command and control acoustic model 514, the command and control acoustic model 514 parses or otherwise analyzes the textual content of the clearance communication and attempts to extract or otherwise identify, if present, one or more of an identifier contained within the request or instruction related to a clearance communication (e.g., a flight identifier, call sign, or the like), an operational subject of the clearance communication (e.g., a runway, a taxiway, a waypoint, a heading, an altitude, a flight level, or the like), an operational parameter value associated with the operational subject in the clearance communication (e.g., the runway identifier, taxiway identifier, waypoint identifier, heading angle, altitude value, or the like), and/or an action associated with the clearance communication (e.g., landing, takeoff, pushback, hold, or the like). Additionally, a secondary speech application 520 may analyze the new clearance communication request or instruction to identify a required parameter from another data source such as the traffic, FMS, ATIS, etc. based on the current context.

For the sake of brevity, conventional techniques related to air traffic control, aviation communications, aviation terminology, flight management, route planning and/or navigation, aircraft procedures, aircraft controls, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The subject matter may be described herein in terms of functional and/or logical block components, and with reference to symbolic representations of operations, processing tasks, and functions that may be performed by various computing components or devices. It should be appreciated that the various block components shown in the figures may be realized by any number of hardware components configured to perform the specified functions. For example, an embodiment of a system or a component may employ various integrated circuit components, e.g., memory elements, digital signal processing elements, logic elements, look-up tables, or the like, which may carry out a variety of functions under the control of one or more microprocessors or other control devices. Furthermore, embodiments of the subject matter described herein can be stored on, encoded on, or otherwise embodied by any suitable non-transitory computer-readable medium as computer-executable instructions or data stored thereon that, when executed (e.g., by a processing system), facilitate the processes described above.

The foregoing description refers to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. Thus, although the drawings may depict one exemplary arrangement of elements, additional intervening elements, devices, features, or components may be present in an embodiment of the depicted subject matter. Also, certain terminology may be used in the following description for reference only, and thus are not intended to be limiting. For example, terms such as "first," "second," and other such numerical terms may be utilized to refer to or distinguish between different elements or structures without implying a sequence or order unless indicated by the context.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the subject matter in any way. Rather, the foregoing detailed description will provide those skilled in the art with a convenient road map for implementing an exemplary embodiment of the subject matter. It should be understood that various changes may be made in the function and arrangement of elements described in an exemplary embodiment without departing from the scope of the subject matter as set forth in the appended claims. Accordingly, details of the exemplary embodiments or other limitations described above should not be read into the claims absent a clear intention to the contrary.

What is claimed is:

1. A system to identify a query parameter contained in an incoming flight voice or data communication to respond to a request, comprising:
   a processing system configured to:
   in response to receipt of a clearance message either by voice or data communication, decode the clearance message to determine whether the clearance message contains a command instruction or clearance data for a flight;
   in response to a determination that the clearance message contains the command instruction or clearance data, either present the command instruction to a pilot as notice to execute the command instruction or if available, obtain at least one query parameter from the clearance data to configure in a query operation to present in response to a pilot question about the command instruction;
   in response to receipt of the voice or data communication, determine further an intent within the voice or data communication of a question or instruction voiced by applying an acoustic model by a command and control module; and identify, by the command and control module, a set of parts contained in voice communication using a speech recognition system or in data communication for tagging identified parts about the question or instruction voiced with query parameters in response to the pilot.

2. The system of claim 1, further comprising:
to respond to the pilot question, segment, by a segmentation module, at least one part of the question or instruction voiced with a particular query parameter associated with a question tag.

3. The system of claim 2, further comprising:
send a remainder, by the segmentation module, of at least one part of the question or instruction voiced not associated with the question tag to a query engine wherein the query engine applies a query acoustic model to decode a query parameter associated with the question or instruction voiced.

4. The system of claim 3, further comprising:
the query engine applies the query acoustic model to:
extract a query parameter of interest contained in a remainder voice communication wherein a query parameter of interest constitutes an answer to the question tag.

5. The system of claim 4, further comprising:
in response to a receipt of the answer, display or voice via a text to speech module, the answer to the pilot to assist in responding to the pilot question.

6. The system of claim 5, wherein the answer is based in part on the query parameter of interest.

7. The system of claim 6, further comprising:
apply, by a second speech recognition module, a second speech application to extract the query parameter of interest contained in a remainder voice communication wherein the query parameter of interest is based on a set of data sources from multiple flight systems.

8. The system of claim 7, further comprising:
implement a parameter identification and storage repository for storing query parameters related to the clearance instruction or the clearance data to assist to respond to the pilot question.

9. A method of detecting a question by a pilot or a clearance instruction in a sequence of communications, the method comprising:
in response to receipt of a clearance message either by a flight voice or data communication, decoding the clearance message for determining whether the clearance message contains a command instruction for a querying operation or clearance data to store locally by an ownship;
in response to determining that the clearance message contains the command instruction or clearance data, presenting the command instruction to a pilot for execution of the command instruction, or if available, obtaining at least one query parameter from the clearance data for configuring in a query operation to respond to the question by the pilot to enable the pilot to confirm execution of the command instruction;
in response to receipt of the flight voice or data communication, determining an intent within the flight voice or the data communication by executing an acoustic model of a command and control module; and
identifying, by the command and control module, a set of parts contained in the flight voice by a speech recognition system or in data communication of text for tagging identified parts wherein the tagging of the identified parts enables identifying one or more questions by query parameters in the flight voice or data communication.

10. The method of claim 9, further comprising:
in response to a question identified by a segmentation module of at least one part of the flight voice or data communication, categorizing the question by tagging an associated query parameter with the flight voice or data communication; and
segmenting, by a segmentation module, a flight voice communication for removing a segment contained in the flight voice or data communication which is associated with a question tag.

11. The method of claim 10, further comprising:
if the voice communication comprises the question tag, sending a remainder, by the segmentation module, of the flight voice or data communication not associated with the question tag to a query engine for applying a query acoustic model for decoding one or more query parameters associated with the flight voice or data communication.

12. The method of claim 11, further comprising:
the query engine applying the query acoustic model by:
extracting a query parameter of interest contained in a remainder flight voice communication wherein a query parameter of interest constitutes a basis of an answer response to the question tag.

13. The method of claim 12, further comprising:
in response to a receipt of the answer response, displaying the answer response to the pilot for assisting in response to a question by tagging the flight voice or data communication.

14. The method of claim 13, wherein the answer response is based in part on the query parameter of interest.

15. The method of claim 14, further comprising:
applying, by a secondary speech recognition module, a secondary speech application for extracting a query parameter of interest contained in a remainder flight voice communication wherein the query parameter of interest is based on a set of data sources from at least flight management systems.

16. The method of claim 15, further comprising:
implementing a parameter identifier and storage repository for storing query parameters related to the clearance instruction or the clearance data for assisting in configuring the query operation.

17. An aircraft system comprising:
a communications system to receive and decode a plurality of requests and instructions related to clearance communications;
a data storage element maintaining a data set of parameter identifiers corresponding to respective clearance communications of each clearance communication;
in response to receipt of a clearance message either by a flight voice or data communication, decode the clearance message to determine whether the clearance message contains a command instruction which has been voiced or clearance data;
in response to the determination that the clearance message contains the command instruction or clearance data, present the command instruction to a pilot to confirm an execute of the command instruction or if available, obtain at least one query parameter from the clearance data to configure a query operation to respond to a pilot question about the command insurance;

in response to receipt of the flight voice or data communication, determine an intent within the flight voice or data communication by applying an acoustic model of a command and control module;

identify, by the command and control module, one or more parts contained in a flight voice communication using a speech recognition system or in data communication;

tag each identified part of the flight voice or data communication; and identify a question or instruction by a query parameter associated with a part of the flight voice or data communication.

18. The aircraft system of claim 17, further comprising:
in response to a question identified, apply a segmentation module to at least one part of the flight voice or data communication to categorize the question by a corresponding tag associated; and
segment, by the segmentation module, the voice communication to remove a voice segment contained in the flight voice communication which is associated with a question tag.

19. The aircraft system of claim 18, further comprising:
if the voice communication comprises the question tag, send a remainder, by the segmentation module, of the flight voice communication not associated with the question tag to a query engine wherein the query engine applies a query acoustic model to decode one or more query parameters.

20. The aircraft system of claim 19, further comprising:
the query engine applies the query acoustic model to:
extract a query parameter of interest contained in a remainder flight voice communication wherein the query parameter of interest corresponds to an answer response to the question tag.

* * * * *